Patented May 12, 1953

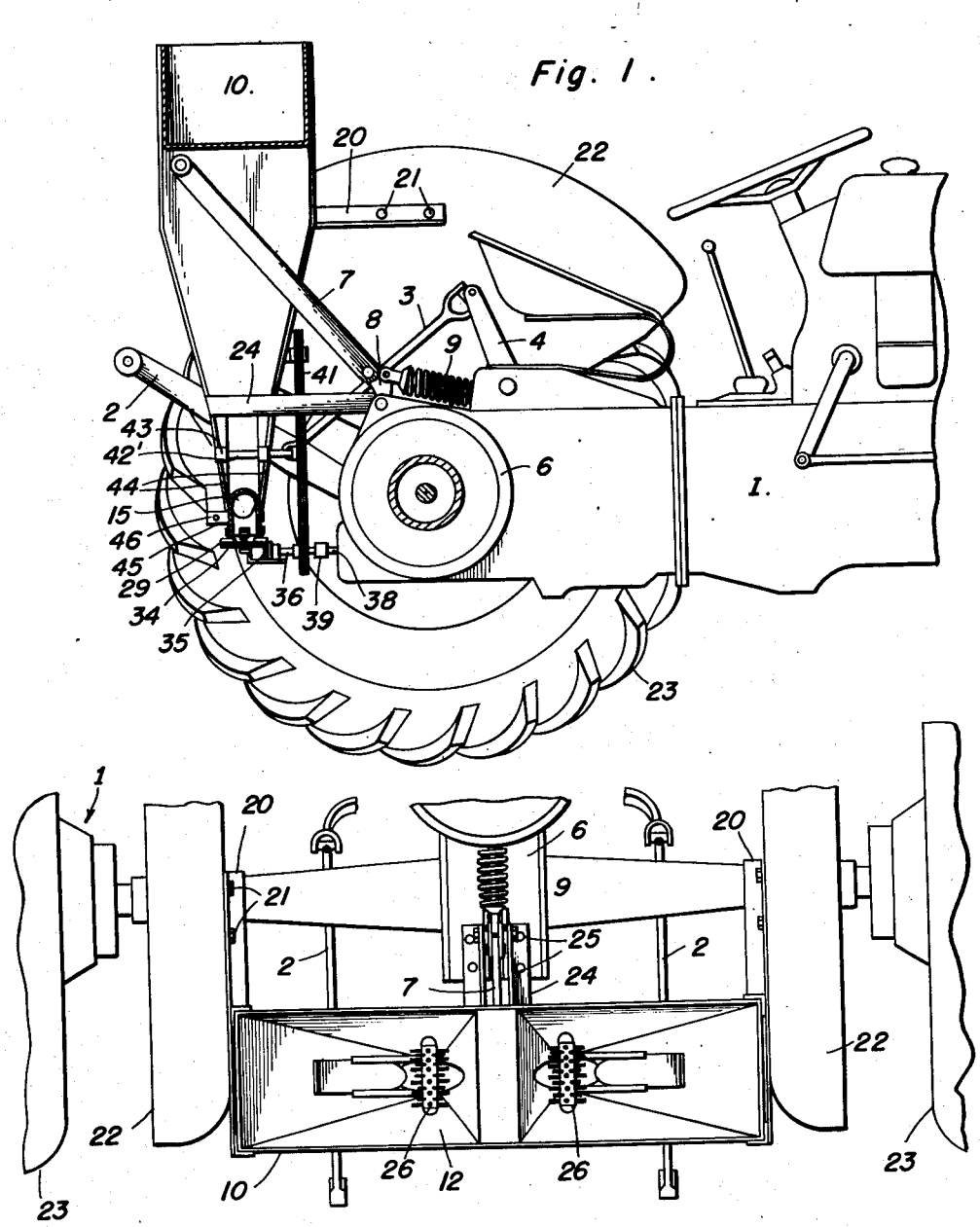

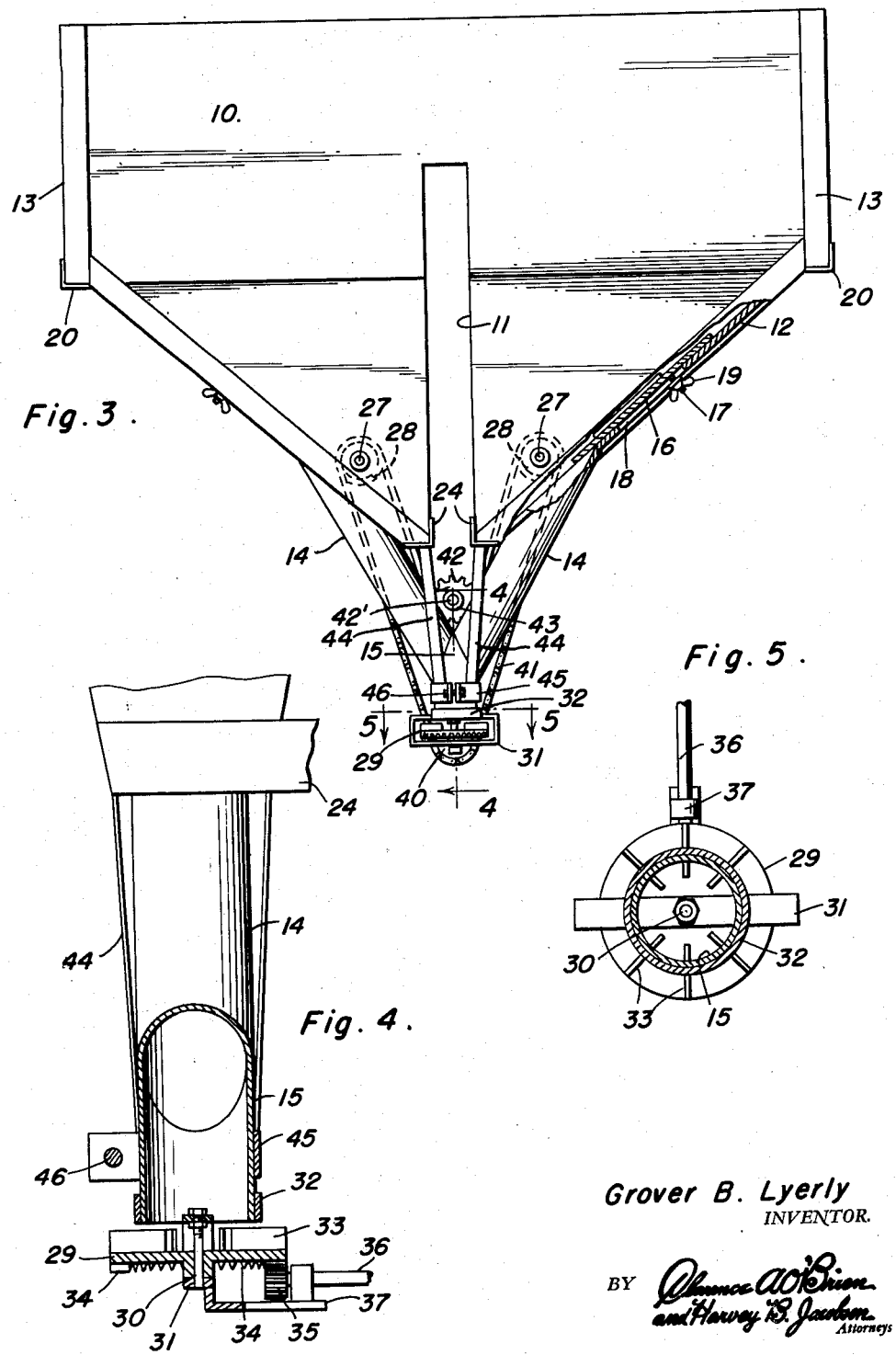
May 12, 1953 — G. B. LYERLY — 2,638,350
TRACTOR MOUNTED SEEDER AND FERTILIZER
Filed Aug. 2, 1948 — 2 Sheets-Sheet 2
Grover B. Lyerly
INVENTOR.

2,638,350

UNITED STATES PATENT OFFICE 2,638,350

TRACTOR MOUNTED SEEDER AND FERTILIZER

Grover B. Lyerly, Jonesboro, Ill.

Application August 2, 1948, Serial No. 41,945

2 Claims. (Cl. 275—8)

My invention relates to improvements in tractor mounted seeders and fertilizers of the broadcaster type.

The primary object of my invention is to provide a simply constructed apparatus operative by the rear power take-off of a farm tractor to broadcast seed, or fertilizer, from the rear of the tractor in advance of ground cultivating or rolling implements carried by the tractor powerlift mechanism, and which will not interfere with the operation of the power-lift mechanism to raise or lower such implements.

Another object is to provide an apparatus of the type and for the purpose above set forth which is adapted for attachment to the usual farm tractor without altering the tractor, and which will not get out of order from long use and is comparatively inexpensive to manufacture and service.

Other and subordinate objects, within the purview of my invention, together with the precise nature of my improvements will be readily understood when the succeeding description and claims are read with reference to the drawings accompanying and forming part of the specification.

In said drawings:

Figure 1 is a fragmentary view, partly in side elevation and partly in vertical section illustrating my invention in a preferred embodiment thereof;

Figure 2 is a fragmentary view in plan;

Figure 3 is a view in rear elevation partly broken away and shown in section of the seed and fertilizer broadcaster;

Figure 4 is a fragmentary view in vertical section taken on the line 4—4 of Figure 3 and drawn to a still larger scale; and, Figure 5 is a view in horizontal section taken on the line 5—5 of Figure 3 and drawn to a larger scale.

Referring to the drawings by numerals, the tractor 1 on which my improved seed and fertilizer broadcaster is especially designed to be mounted is of the conventional type equipped with rear power-lift mechanism including a pair of vertically swingable rear side lift arms 2 operative through links 3 and hydraulically operative cranks, one of which is shown at 4, on a transverse rock shaft journalled above the differential casing 6 of the tractor 1. The side lift arms 2 are usually connected to an implement carrying bar, not shown, for cultivator implements, or to a ground working roller, not shown. The power lift mechanism further includes a vertically movable compression and tension bar 7 extending rearwardly from the tractor in the longitudinal center thereof, above the side lift arms 2 from a rocker 8 pivoted on said casing 6 to operate a spring pressed control shaft 9 for controlling the power lift mechanism, all as is well known and understood in the art and fully set forth in U. S. Letters Patent No. 2,118,- 180 to H. G. Ferguson to which attention is invited for details of such mechanism.

The seed and fertilizer broadcaster of my invention comprises a hopper 10, of any suitable material, for seed or fertilizer mounted, by means presently described, at the rear of the tractor 1 between the side lift arms 2 and forwardly of the rear ends of said arms for a particular purpose presently seen. The hopper 10 is provided with a vertical central slot 11 to straddle the compression and tension bar 7 and so as to extend above and below said bar and permit working of said bar without interfering with said hopper.

The bottom 12 of the hopper 10 inclines downwardly from both sides 13 thereof to the open bottom of the slot 11 and opens adjacent to said slot into the upper ends of branches 14 of a Y-shaped dropper boot 15 depending from the bottom of said hopper 10 in the center thereof.

A pair of gate valves 16 suitably mounted in the bottom 12 of the hopper 10 provide for opening and closing the upper ends of branches 14, said valves being preferably of the sliding type. Bolts 17 in said valves 16 projected through slots 18 in the bottom 12 of the hopper 10 and having wing nuts 19 thereon provide for securing the valves 16 in open or closed positions by turning of said wing nuts against the bottom 12 of said hopper.

A pair of horizontal side angle bars 20 extend forwardly from opposite sides of the hopper 10 and are suitably detachably attached, as by bolts 21, to the usual fenders 22 for the rear tractor wheels 23. A similar pair of bars 24 extend forwardly from the bottom 12 of the hopper 10 at the lower end and opposite sides of the slot 11 and are suitably secured, as by bolts 25, to the differential casing 6. The angle bars 20, 24 support the hopper 10 on the tractor well forwardly of the rear ends of the side lift arms 2 out of interfering relation to implements attached to said arms 2 in the manner already referred to.

A pair of rotary agitator reels 26 in the bottom portion of the hopper 10, directly over the upper ends of the branches 14 of the dropper boot 15 have the shafts 27 thereof suitably journalled in said hopper 10 and extending forwardly out of said hopper with a pair of front end sprocket wheels 28 fastened thereon to be driven as presently described.

A rotary broadcaster disc 29 is provided beneath the lower end of the dropper boot 15 and is fast on a vertical shaft 30 journalled in vertical alignment with said boot in a skeleton bracket 31 depending from said boot and fixed thereto by an annulus 32 forming part of said bracket and suitably fastened to said lower end of said boot 15, in a manner not shown. The broadcaster disc 29 is provided with upstanding radial fins 33 for causing said disc to throw seed or fertilizer falling thereon broadcast in a manner which will be understood. The broadcaster disc 29 has a bottom ring gear 34 thereon in mesh with a subjacent spur gear 35 fast on a horizontal forwardly extending driven shaft 36 journalled at one end in a bearing 37 forming a part of the bracket 31. The driven shaft 36 forms an extension of the rear power take-off shaft 38 of the tractor 1 and is detachably coupled to said shaft 38 by a suitable coupling 39. A driven sprocket wheel 40 is fast on the driven shaft 36 in a common plane with the sprocket wheels 28. A sprocket chain 41 extends from the sprocket wheel 40 over the sprocket wheels 28 and is looped downwardly between the sprocket wheels 28 under an idler sprocket wheel 42 fast on a horizontal shaft 42' journalled in bearings 43 on pairs of hanger bars 44 depending from the bars 24 in front of and behind the dropper boot 15 with lower ends joined by a split clamping band 45 clamped around the lower end of the seed dropper boot 15 by a bolt 46. The hanger bars 44 brace the dropper boot 15, as will be clear, from the bars 24 and hold said boot up in proper position relative to the hopper 10.

The manner in which the invention operates will be readily understood. As the tractor 1 is driven forwardly for cultivation or ground rolling purposes, seed or fertilizer in the hopper 10 feeds by gravity, under control of the gate valves 16, into the branches 14 of the dropper boot 15 to drop out of said booth onto the broadcaster disc 29. With the power take-off shaft 38 operating, the broadcaster disc 29 is rotated to throw the seed, or fertilizer, thereon broadcast under the action of centrifugal force. At the same time, the sprocket and gear drive including the sprocket wheels 40, 28, 42 and the sprocket chain 41 imparts rotation to the agitator reels 26, which agitate the seed, or fertilizer, in the bottom portion of the hopper 10 to prevent the branches 14 of the dropper boot 15 from becoming clogged at the hopper. As will be manifest, the seed, or fertilizer, is broadcast in front of any ground-working implements which may be attached to the hydraulic power-lift mechanism of the tractor 1, so that the seed, or fertilizer, is turned, or rolled, as the case may be, into the ground, the broadcaster disc 29 operating well in front of such implements to broadcast well in front of the same.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. Seed and fertilizer broadcasting apparatus for mounting at the rear of a tractor to be driven by the rear power take-off of the tractor comprising a hopper having a vertical central bottom recess therein of sufficient width and depth to straddle a vertically movable rear power lift control bar on the tractor without impeding free movement of said bar, a pair of horizontal upper hopper mounting bars fixed to opposite sides of the hopper and adapted to be fixed to opposite sides of the tractor, a pair of lower horizontal hopper mounting bars fixed to the bottom of the hopper at opposite sides of the recess and adapted to be attached to the tractor, said pairs of bars supporting the hopper at the rear of the tractor with said recess adapted to straddle said control bar in the plane of vertical movement thereof, a Y-shaped dropper boot depending from the bottom of the hopper from opposite sides of said recess and into which said hopper discharges upon both sides of the recess, adjustable discharge control valves in said hopper, a rotary broadcasting member beneath the bottom of the boot, a bracket mounting for said member attached to said boot, a drive for said member including a driven shaft journaled on said bracket and adapted to be coupled to said power take-off, a pair of agitator reels over the upper ends of said boot having shafts journaled in the hopper and extending forwardly out of the same, and a sprocket and chain drive between said driven shaft and the extending ends of the shafts of said reels.

2. Seed and fertilizer broadcasting apparatus for mounting at the rear of a tractor to be driven by the rear power take-off of the tractor comprising a hopper having a vertical central bottom recess therein of sufficient width and depth to straddle a vertically movable rear power lift control bar on the tractor without impeding free movement of said bar, a pair of horizontal upper hopper mounting bars fixed to opposite sides of the hopper and adapted to be fixed to opposite sides of the tractor, a pair of lower horizontal hopper mounting bars fixed to the bottom of the hopper at opposite sides of the recess and adapted to be attached to the tractor, said pairs of bars supporting the hopper at the rear of the tractor with said recess adapted to straddle said control bar in the plane of vertical movement thereof, a Y-shaped dropper boot depending from the bottom of the hopper from opposite sides of said recess and into which said hopper discharges upon both sides of the recess, adjustable discharge control valves in said hopper, a rotary broadcasting member beneath the bottom of the boot, a bracket mounting for said member carried by the lower end of the boot, and a drive for said member including a driven shaft journaled at one end on said bracket and having a coupling on its other end adapted for attachment to said power take-off.

GROVER B. LYERLY.

References Cited in the file of this patent

UNITED STATES PATENTS

| Number | Name | Date |
|---|---|---|
| 365,519 | Hotham | June 28, 1887 |
| 864,595 | Aspinwall | Aug. 27, 1907 |
| 1,285,183 | Holden | Nov. 19, 1918 |
| 1,619,795 | Roby | Mar. 1, 1927 |
| 1,655,780 | Brininger et al. | Jan. 10, 1928 |
| 1,940,008 | Mosgrove | Dec. 19, 1933 |
| 2,124,198 | Kriegbaum et al. | July 19, 1938 |
| 2,162,689 | Mayfield | June 20, 1939 |
| 2,256,655 | Stewart | Sept. 23, 1941 |
| 2,293,977 | Hoffstetter | Aug. 25, 1942 |